United States Patent
Gauthier et al.

(10) Patent No.: US 6,461,689 B1
(45) Date of Patent: Oct. 8, 2002

(54) METHOD OF CONTROLLING SPECULAR GLOSS CHARACTERISTICS

(75) Inventors: Martin Gauthier, St-Hubert; Claude Charest, St-Bruno de Montarville; René Ménard, Cowansville; Jean-François Courtoy, St-Bruno de Montarville, all of (CA)

(73) Assignee: Domco Tarkett Inc., Farnham (CA)

( * ) Notice: Subject to any disclaimer, the term of this patent is extended or adjusted under 35 U.S.C. 154(b) by 0 days.

(21) Appl. No.: 09/652,442

(22) Filed: Aug. 31, 2000

(51) Int. Cl.[7] .................................................. C08J 7/04
(52) U.S. Cl. ................. 427/494; 427/385.5; 427/393.5; 427/407.1; 427/496; 427/498; 427/508; 427/512; 427/551; 427/558; 427/559; 427/581
(58) Field of Search ................................ 427/494, 496, 427/498, 508, 512, 551, 558, 559, 581, 385.5, 393.5, 407.1

(56) References Cited

U.S. PATENT DOCUMENTS

| | | | |
|---|---|---|---|
| 3,918,393 A | 11/1975 | Hahn | |
| 4,005,244 A | 1/1977 | Wismer | |
| 4,072,770 A | 2/1978 | Ting | |
| 4,075,366 A | 2/1978 | Packer | |
| 4,169,167 A | 9/1979 | McDowell | |
| 4,264,643 A | 4/1981 | Granata | |
| 4,313,969 A | 2/1982 | Matthews | |
| 4,393,187 A | 7/1983 | Boba | |
| 4,411,931 A | 10/1983 | Duong | |
| 4,421,784 A | 12/1983 | Troue | |
| 4,485,123 A | 11/1984 | Troue | |
| 4,569,966 A | 2/1986 | Piccirilli | |
| 5,169,704 A | 12/1992 | Faust | |
| 5,672,393 A | 9/1997 | Bachmann | |
| 5,679,721 A | 10/1997 | Courtoy | |
| 5,922,473 A | 7/1999 | Muthiah | |

*Primary Examiner*—Bernard Pianalto
(74) *Attorney, Agent, or Firm*—Norris McLaughlin & Marcus

(57) ABSTRACT

The specular gloss of a polyurethane wear layer of a surface covering is controlled by controlling the thermal conditions of a substrate before and after it is coated with a liquid polyurethane and by controlling the termal conditions of the liquid polyurethane before it is coated on the substrate. The liquid polyurethane is photo-curable or radiation-curable and it contains a matting agent. Changes in specular gloss are attained without changing the composition of the polyurethane or the conditions of photo-curing or radiation curing.

9 Claims, 8 Drawing Sheets

METHOD OF CONTROLLING SPECULAR GLOSS CHARACTERISTICS

BACKGROUND OF THE INVENTION

1. Field of the Invention

The present invention has to do with polyurethane wear layers for floor and wall coverings wherein the specular gloss of the polyurethane wear layer is determined by controlling the thermal conditions of a substrate, a liquid polyurethane coating composition before it is coated on the substrate and/or the coated substrate before the polyurethane is cured. More specifically, we have found that controlled changes in the thermal conditions of the 1) substrate prior to applying the liquid polyurethane coating composition, 2) the liquid coating composition and 3) the substrate after applying the liquid coating composition but before curing, provides different and predictable specular gloss indices without otherwise changing the curing conditions or the composition of the polyurethane. The polyurethane compositions employed according to the invention must contain matting agents.

2. The Related Art

Wear layer surfaces of floor covering products, such as resilient sheet materials, tiles and wood, are usually prepared from plastisols or polyurethanes, or a layer of plastisol and a layer of polyurethane, or other combinations of layers as are known to those skilled in the art. Most plastisols for vinyl flooring products are formulated using polyvinylchloride (PVC) emulsion resins mixed with primary and secondary plasticizers, extenders, stabilizers and other additives. Plastisol wear layers are discussed in detail in U.S. Pat. No. 5,679,721 and polyurethane wear layers are discussed in U.S. Pat. No. 5,169,704.

It is known to modify the gloss of a surface layer by adjusting the atmospheric conditions of curing. For example, a method of producing flat (non-glossy) films is described in U.S. Pat. No. 3,918,393, assigned to PPG Industries, Inc., wherein a radiation sensitive or actinic light sensitive composition is cured under ionizing radiation or actinic light and two curing stages are employed. The first stage comprises partial curing in air and the second stage comprises completing curing in an inert gas atmosphere, for example, a nitrogen atmosphere.

According to U.S. Pat. No. 4,169,167, the gloss of energy-curable coating and ink compositions is reduced by exposing such compositions to actinic radiation in an oxygen rich atmosphere at different intensity levels. The curable polyurethanes employed according to the patent must include a flatting agent in order to attain any effective degree of gloss reduction.

Low gloss and gloss controlled radiation cured coatings are obtained by employing different radiation wavelengths at different curing stages according to U.S. Pat. No. 4,313,969. Coating compositions containing inert particles are employed and gloss control is obtained by adjusting the spectral distribution, the intensity, or the dose of the initial radiation, or by adjusting the time interval between the initial and subsequent irradiation steps. Another reference which describes the use of different wavelengths to control surface properties of a surface coating is U.S. Pat. No. 4,411,931 wherein surface texture is controlled with a three stage UV curing process employing various wavelengths and curing atmospheres.

Matting agents are employed according to the present invention and they are incorporated in liquid polyurethane compositions. The matting agents are comprised of microparticles which are made of mineral and/or polymeric materials and the microparticles are incorporated in the liquid. Polymeric microparticles and dispersions of polymeric microparticles in coating compositions are discussed in U.S. Pat. No. 4,569,966. The microparticles can act as a processing aid and they can affect the characteristics of the coating compositions before and after they are cured.

We have now discovered that the specular gloss of a polyurethane wear layer can be controlled by manipulating the thermal conditions of 1) a substrate, 2) a liquid polyurethane coating composition before it is coated on the substrate and/or 3) a coated substrate prior to curing the polyurethane, wherein the liquid polyurethane coating composition contains a matting agent. We have found that variations in the temperature of any one of the three elements referenced above has an impact on curing speed and viscosity of the liquid coating which determines the location of the matting agent relative to the surface in the cured product and accordingly affects specular gloss of the product. Higher temperatures cause the viscosity to drop and this helps the matting agent to migrate to the surface, especially when the microparticles of the matting agent have a low density relative to the liquid polyurethane. However, higher temperatures above a certain threshold (which varies with the polyurethane chemistry) also cause faster curing which slows migration of the microparticles. These competing factors are controlled according to the present invention to permit manufacturers to control the specular gloss of the finished coating using a low cost temperature control technique.

We have also discovered a method of predicting the gloss characteristics based upon the viscosity and chemical reactivity of a polyurethane photopolymer and the energy supplied during curing.

SUMMARY OF THE INVENTION

Floor covering and wall covering products having a polyurethane wear layer are prepared using a polyurethane which has matting agents incorporated therein. A photo-curable or radiation-curable liquid polyurethane incorporating matting agents is conventionally coated over a substrate which comprises a surface covering material requiring a wear layer or an additional wear layer of polyurethane. The temperature of the substrate prior to coating the polyurethane thereon is adjusted to a predetermined value, the temperature of the liquid polyurethane is adjusted to a predetermined value prior to coating it on the substrate and the temperature of the substrate after the polyurethane is coated thereon is adjusted to a predetermined value, whereby the combination of substrate temperatures before and after coating the polyurethane thereon, and the coating temperature before coating it on the substrate, will cause the subsequently cured polyurethane to have a pre-determined specular gloss. Changes in any one or more of these temperatures will change the specular gloss of the cured polyurethane wear layer. No changes in the curing atmosphere (e.g., air, nitrogen) or the energy of the curing atmosphere or the composition of the polyurethane are required to obtain the changes in specular gloss which are brought about by the process of the invention. Accordingly, the invention provides a technique for producing products with different specular gloss characteristics on the same production line at little or no cost and without varying the formulation of the liquid polyurethane coating.

DETAILED DESCRIPTION OF THE PREFERRED EMBODIMENT

The temperature of a surface covering substrate is adjusted to a predetermined value using heating or cooling apparatus or techniques which are well known in the surface covering art. A liquid polyurethane coating composition is adjusted to a predetermined temperature and a smooth coating of the polyurethane is then applied to the substrate using conventional equipment such as a knife-over roll coater, direct roll coater, rotary screen, draw down bar, reverse roll coater or wire wound bar. Where the surface is embossed before application of the polyurethane, it is preferable to use a direct roll coater or an air knife coater. The polyurethane is applied at a thickness of from about 0.2 to 3 mils. Thicker layers can be used but they generally are not economic, and thinner layers do not effectively provide the desired properties of the polyurethane as a wear layer. In a preferred embodiment, the polyurethane layer is applied over a wear layer comprised of a clear plasticized PVC.

Figure 1:
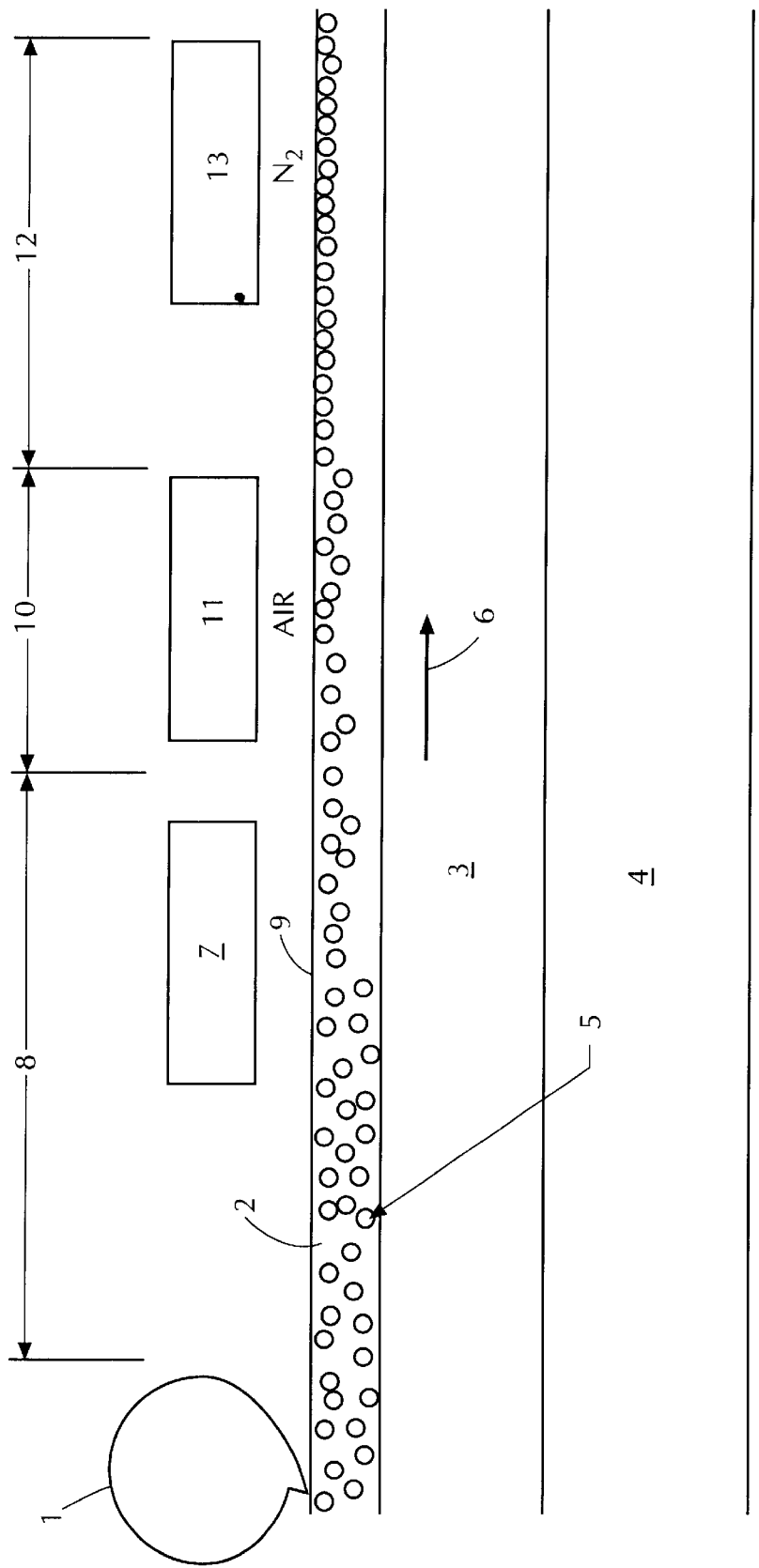
FIG. 1 is a schematic, side sectional view of a portion of a resilient floor covering production line illustrating in expanded section the polyurethane layer of the invention and the matting agent therein.

Referring to FIG. 1, air knife 1 applies a smooth coating of polyurethane 2 over a fused plastisol or clear plasticized PVC wear layer 3. The wear layer overlays element 4 which comprises the decorative and other features of a surface covering such as a resilient floor or wall covering. The terms substrate or substrate sheet as they are used herein comprise the combination of wear layer 3 and element 4 or element 4 itself in embodiments where the polyurethane wear layer is not applied over another wear layer.

The polyurethane contains a matting agent comprising microparticles 5 and the polyurethane must be photocurable, as by ultraviolet (UV) light, or radiation-curable, as by ionizing radiation.

The substrate moves in the direction of arrow 6 and the temperature of the substrate after it is coated with the polyurethane is adjusted using heater 7 while the polyurethane is in the liquid stage as generally represented by the area 8. Heater 7 can be an infrared (IR) heating device or other conventional heating device which will not cause curing of the polyurethane.

Figure 2:
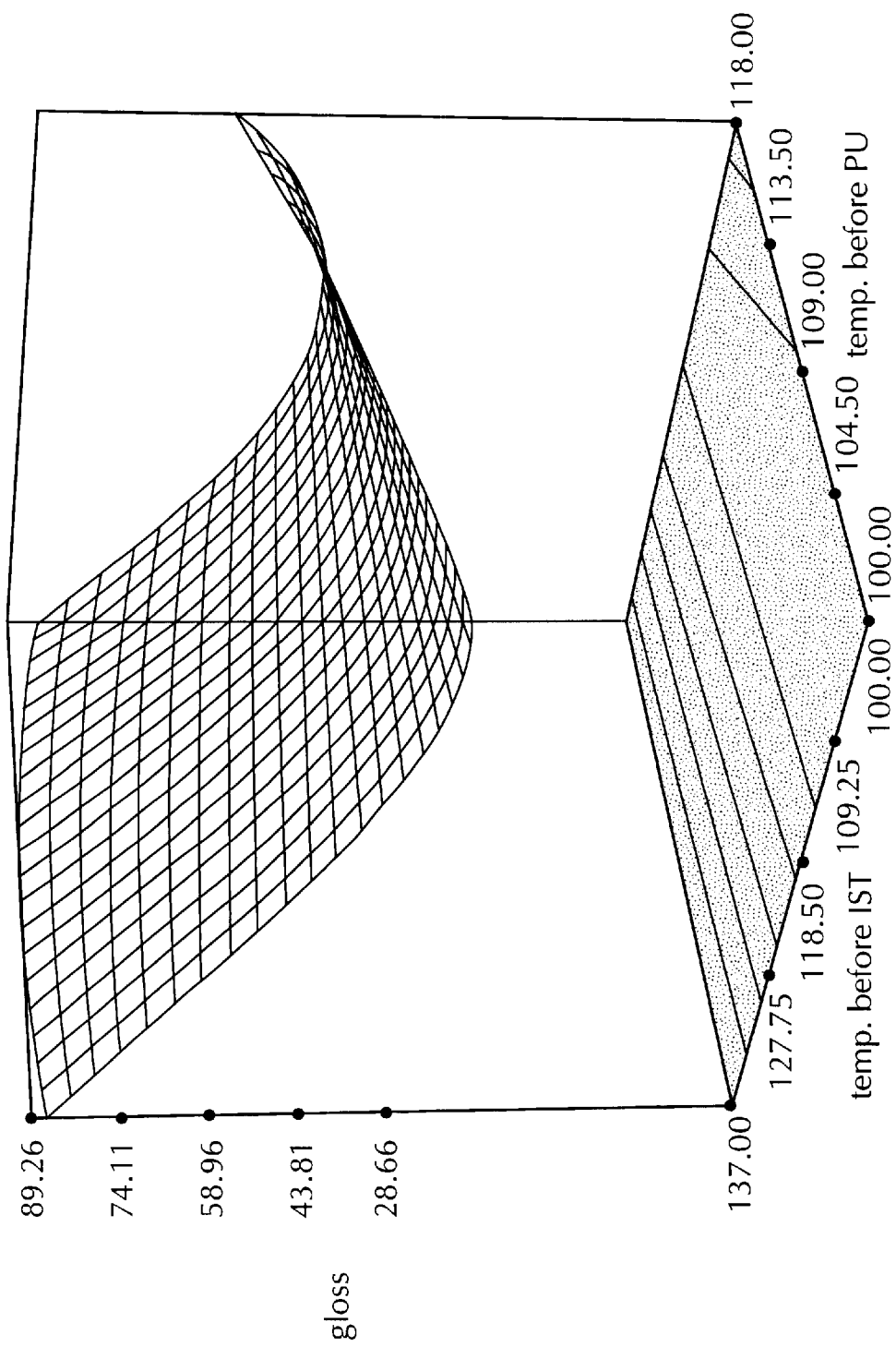
FIG. 2 is a three dimensional graph illustrating variations in specular gloss for a predetermined set of air cure energy and polyurethane coating temperature with various substrate temperature conditions before and after the polyurethane is applied to the substrate.
Figure 3:
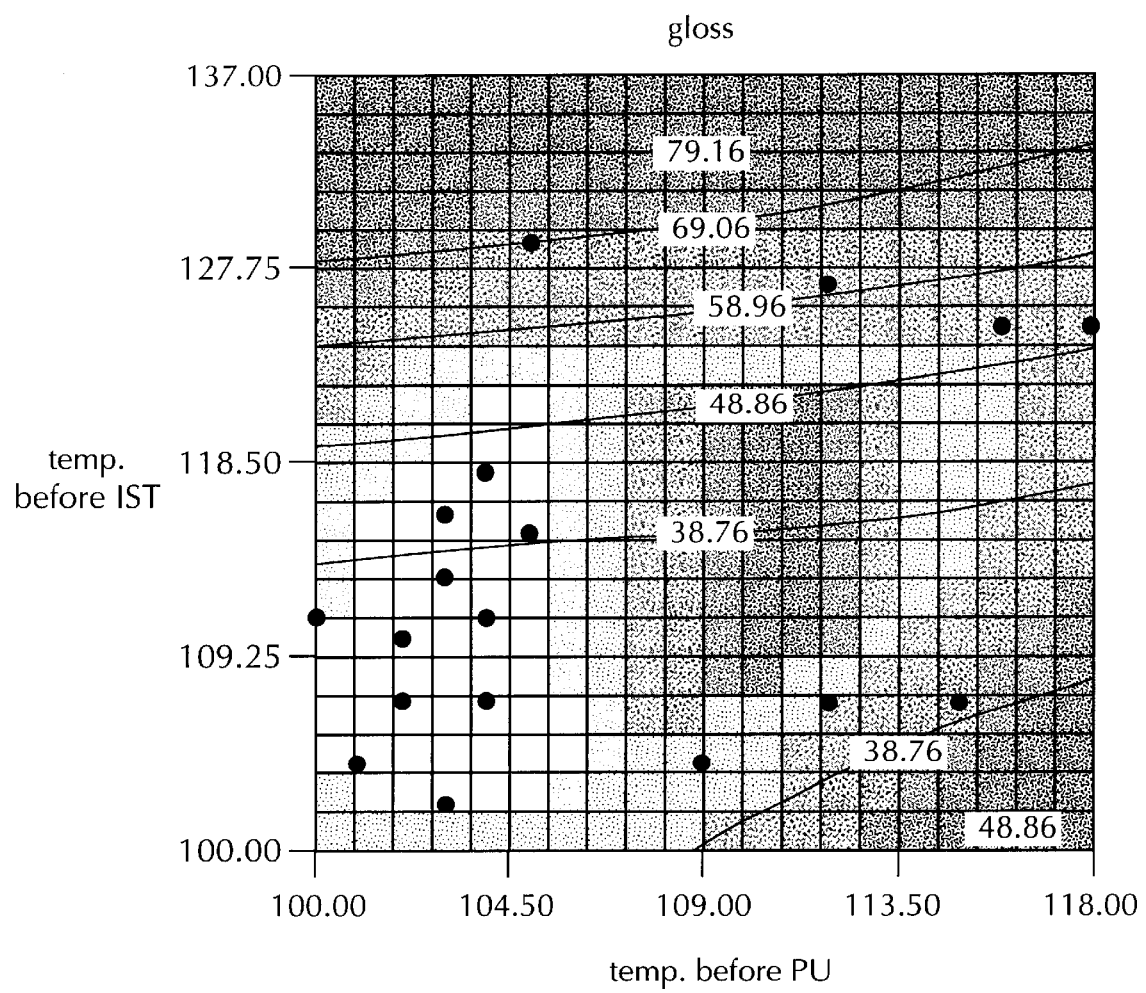
FIG. 3 is a two dimensional graph illustrating the substrate temperature conditions of FIG. 2.
Figure 4:
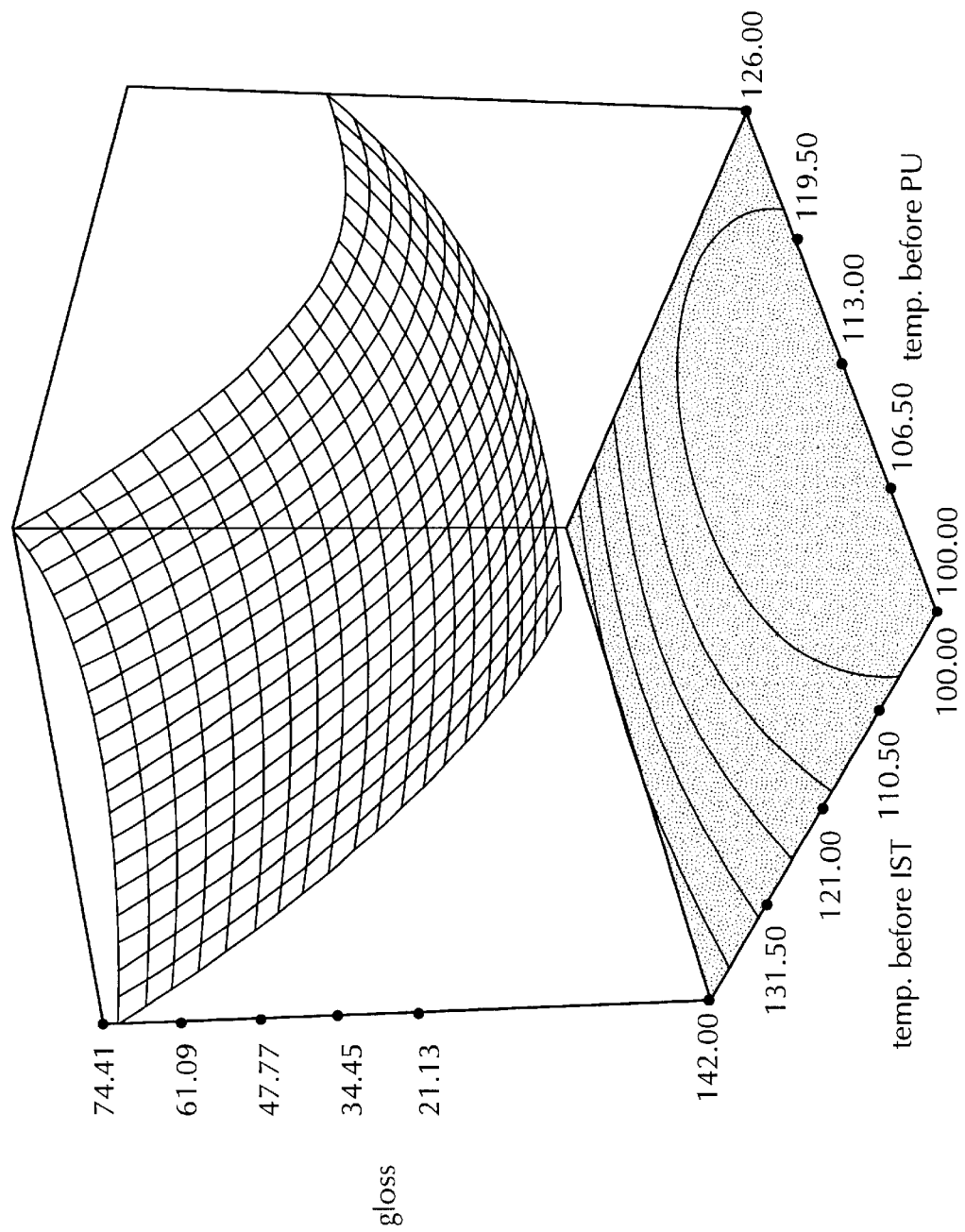
FIG. 4 is a three dimensional graph illustrating variations in specular gloss for another predetermined set of air cure energy and liquid polyurethane coating temperature with various substrate temperature conditions before and after the polyurethane is applied to the substrate.

We have discovered that the combination of the temperature of the substrate before the application of the liquid polyurethane layer, the temperature of the liquid polyurethane layer just prior to coating it on the substrate and the temperature of the substrate after the application of the liquid polyurethane layer, but before curing of the polyurethane, will cause the cured polyurethane wear layer to have a particular specular gloss index which can be predicted according to the principles of the present invention. This index can be changed by varying the temperatures of one, two or all three of the components as illustrated in FIGS. 2 and 4 which are discussed with reference to the examples below. The ranges of temperatures within the scope of the invention for each of the components are as follows:

Uncoated substrate: From about 100° F. to about 170° F. and preferably from about 130° F. to about 155° F.;

Liquid polyurethane: From about 100° F. to about 170° F. and preferably from about 140° F. to about 150° F.;

Coated substrate: From about 100° F. to about 200° F. and preferably from about 130° F. to about 175° F.

The range of specular gloss which can be attained according to the invention is from about 9 to about 80, preferably from about 25 to about 75, measured at an angle of 60°.

As explained earlier in this specification, the temperature conditions affect the reactivity of the polyurethane and the migration of the matting agent 5 before the microparticles comprising the matting agent are fixed in place within the polyurethane when it is cured as a solid. Accordingly, the location of the microparticles 5 relative to the top surface 9 of the polyurethane affects the specular gloss of the cured polyurethane wear layer.

After the polyurethane coated substrate passes through liquid stage 8, it enters a pre-curing stage represented by area 10 wherein the polyurethane is subjected to UV light element 11 in an atmosphere of air. Then it enters a final curing stage represented by area 12 wherein it is subjected to UV light element 13 in a predominantly nitrogen ($N_2$) atmosphere. Of course, different UV or radiation curing conditions or atmospheres can be used without departing from the spirit of the invention, it being understood that no change in these conditions is required in order to prepare surface covering products having different indices of specular gloss.

Figure 1A:
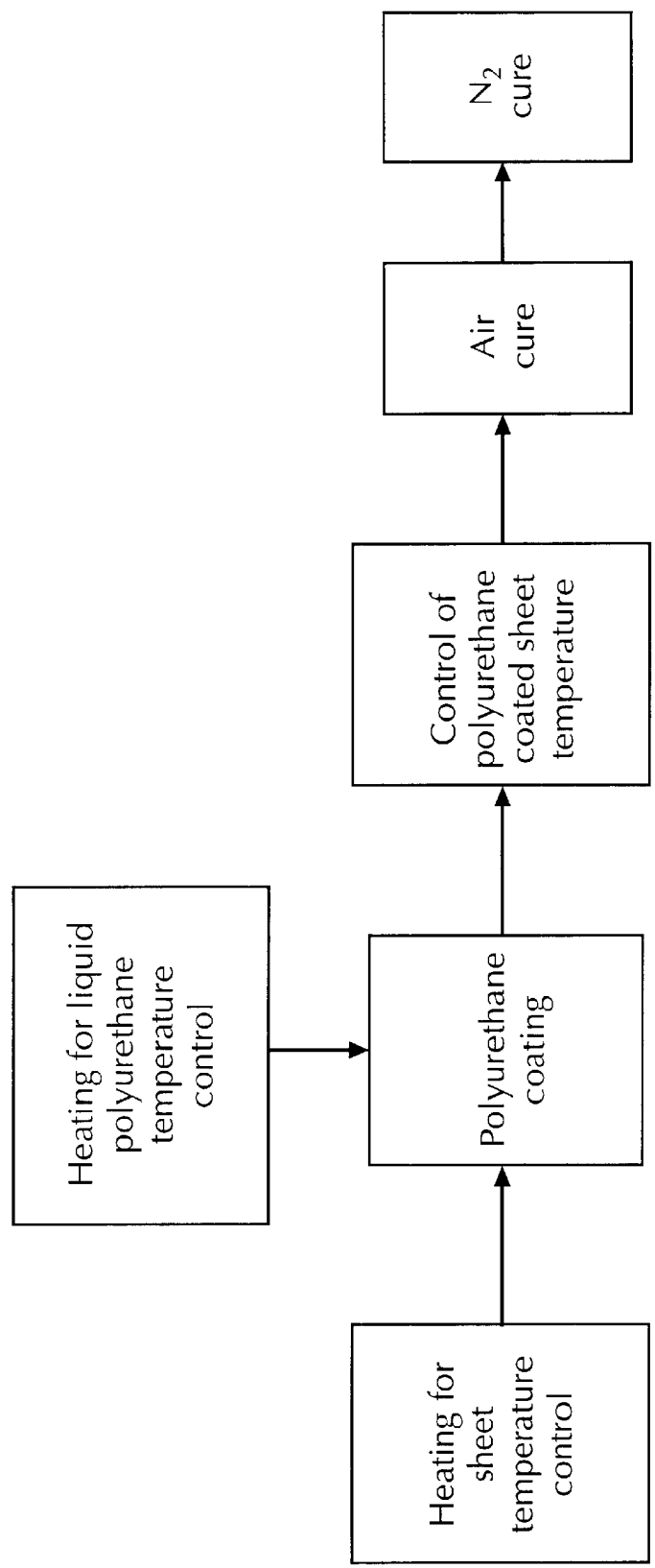
FIG. 1A is a block diagram of the unit processes corresponding with FIG. 1.

FIG. 1A is a block diagram of the various unit processes corresponding with FIG. 1 and the foregoing description.

EXAMPLES

In the following examples, specular gloss was measured according to ASTM Designation: D523, Standard Test Method for Specular Gloss which covers the measurement of the specular gloss of non-metallic specimens for glossmeter geometries of 60, 20 and 85°. The UV equipment used was a UV air cure unit from IST METZ Gmbh Lautestrabe 18 d-72622 Nurtingen Germany. It was followed by a UV unit under nitrogen cure (to obtain a final through cure) also from IST. Another suitable UV/air cure unit is available from Eltosch Torstein Schmidt Gmbh (Eltosch north America Brrokfield, Wis. 53005). Installed prior to the UV/air cure unit, was an Infra red (IR) field which was used to heat the surface of the sheet. The low gloss polyurethane, U359, was supplied by Lord Corporation from Erie Pa. USA.

Example I

Sheet vinyl materials comprised of a clear polyvinylchloride wear layer on top of a chemically embossed layer adhered to a base of felt and having the dimensions of 12 feet wide and 60 mils thick were coated with a smooth uniform layer of an ultraviolet curable polyurethane using an air knife. PHOTOGLAZE U359 polyurethane available from Lord Chemical Products, Erie, Pa., U.S.A. was employed.

Referring to FIG. 1 which schematically illustrates the curing equipment employed, the coated sheet vinyl materials were generally subjected to the conditions set forth in Table I. The designations Uva, Uvb, Uvc and Uvv refer to standardized wavelengths for photoinitiators as are known in the art. The total energy is the sum of the radiated emissions power employed, i.e., the amount of energy applied to the coating to cure it.

TABLE I

Condition A-Polyurethane Coating Temperature 130° F.

| | |
|---|---|
| Speed of the conveyor (m/min) | 20 |
| Uva (j/cm$^2$) | 0.090 |
| Uvb (j/cm$^2$) | 0.088 |
| Uvc (j/cm$^2$) | 0.014 |
| Uvv (j/cm$^2$) | 0.047 |
| Total energy (mj/cm$^2$) | 155.8 |
| UV peak (mW/cm$^2$) | 128 |

Details of the curing conditions, temperature of the sheet prior to application of the polyurethane and other parameters are set forth in Table II.

TABLE II

| Condition A | Sheet temperature before the PU application PU(° F.) | Sheet temperature with the PU before entering the UV reactor (° F.) | Thickness of the PU (mils) | Gloss after the first UV reactor (60°) | Gloss after the second reactor (60°) |
|---|---|---|---|---|---|
| 1 | 74 | 74 | 2 | 50.6 | 53.4 |
| 2 | 74 | 87 | 1.26 | 46 | 44.1 |
| 3 | 74 | 95 | 1.26 | 53.8 | 49.7 |
| 4 | 74 | 95 | 1.5 | 45.8 | 41 |
| 5 | 74 | 112 | 2.31 | 66.3 | 61.3 |
| 6 | 74 | 112 | 2.52 | 66.9 | 68 |
| 7 | 74 | 121 | 1.47 | 68.8 | 68.9 |
| 5 | 74 | 129 | 1.85 | 57.9 | 60.5 |
| 9 | 74 | 137 | 1.51 | 54.6 | 50.7 |
| 10 | 100 | 111 | 0.89 | 39.1 | 39.1 |
| 11 | 101 | 104 | 1.99 | 27.8 | 28.2 |
| 12 | 102 | 107 | 2.03 | 26.7 | 30.2 |
| 13 | 102 | 110 | 1.14 | 39.5 | 43.1 |
| 14 | 103 | 98 | 1.69 | 29.3 | 32.5 |
| 15 | 103 | 102 | 1.02 | 36.6 | 32.5 |
| 16 | 103 | 113 | 1.48 | 38.2 | 35.2 |
| 17 | 103 | 116 | 1.57 | 36.1 | 37.9 |
| 15 | 104 | 107 | 1.36 | 26.2 | 28.1 |
| 19 | 104 | 111 | 1.69 | 26.3 | 26 |
| 20 | 104 | 118 | 1.1 | | 51.7 |
| 21 | 105 | 115 | 1.02 | 41.5 | 34.7 |
| 22 | 105 | 129 | 1.36 | 71 | 65.6 |
| 23 | 105 | 129 | 1.36 | 71 | 65.6 |
| 24 | 112 | 107 | 1.02 | 39.9 | 38.2 |
| 25 | 112 | 127 | 1.02 | 58 | 65.2 |
| 26 | 115 | 107 | 1.02 | 38.9 | 37.6 |
| 27 | 116 | 126 | 1.1 | 53.5 | 54.8 |
| 28 | 118 | 125 | 1.1 | 44.9 | 46.6 |

The data illustrates that at a constant liquid polyurethane coating temperature and at a constant curing atmosphere energy, changes in sheet temperature before and/or after polyurethane application will change the specular gloss. Accordingly, we were able to achieve gloss control anywhere within the range from about 26 to about 70 (when measured at a 60° angle setting on the gloss meter). We have also concluded that the nitrogen cure in the second reactor has little or no effect on gloss of the end product. Accordingly, the gloss following curing in the first UV reactor in an air atmosphere will closely approximate or be the same (within experimental error) as the gloss following the nitrogen cure.

The data from Table II was used to develop an equation for predicting specular gloss. We used a software package sold under the name Design Expert by Stat Ease Inc., Hennepin Square, Suite 191, 2021 East Hennepin Avenue, Minneapolis, Minn. 55413-2723 U.S.A., to plot the data as illustrated in FIGS. II and IIII and to develop the following Equation (I) for predicting specular gloss at a polyurethane coating temperature of 130° F.

$$\text{gloss} = 1070.34 - (25.24 \times TBPU) -$$
$$(3.83 \times TBIST) + (0.39 \times TBPU^2) +$$
$$(0.12 \times TBIST^2) - (0.25 \times TBPU \times TBIST) -$$
$$(3.131E-04 \times TBPU^3) -$$
$$(1.141E-03 \times TBIST^3) -$$
$$(2.459E-03 \times TBPU^2 \times TBIST)$$
$$-(3.123E-03 \times TBPU \times TBIST^2) \qquad (I)$$

where:
TBPU=temperature of substrate before polyurethane application

TBIST=temperature of the coated substrate before entering the UV reactor.

Diagnostic case statistics were run to compare actual and predicted values of specular gloss with the following results:

| Diagnostic Case Statistics | | |
|---|---|---|
| Standard Order | Actual Value | Predicted Value |
| 1 | 33.30 | 34.37 |
| 2 | 38.20 | 35.15 |
| 3 | 65.20 | 60.38 |
| 4 | 37.60 | 37.41 |
| 5 | 54.80 | 52.49 |
| 6 | 46.60 | 50.67 |
| 7 | 68.90 | 67.91 |
| 8 | 61.30 | 63.52 |
| 9 | 53.40 | 53.42 |
| 10 | 49.70 | 46.73 |

The foregoing results were within acceptable ranges of experimental error.

Example II

Sheet vinyl materials of the same composition and dimensions as in Example I were coated with PHOTOGLAZE U359 and generally subjected to the conditions set forth in Table III.

TABLE III

Condition B-Polyurethane Coating Temperature 130° F.

| | |
|---|---|
| Speed of the conveyor (m/min) | 20 |
| Uva (j/cm$^2$) | 0.034 |
| Uvb (j/cm$^2$) | 0.035 |
| Uvc (j/cm$^2$) | 0.006 |

TABLE III-continued

Condition B-Polyurethane Coating Temperature 130° F.

| | |
|---|---|
| Uvv (j/cm²) | 0.018 |
| Total energy (mj/cm²) | 70.2 |
| UV peak (mW/cm²) | 92 |

Details of the curing conditions, temperature of the sheet prior to application of the polyurethane and other parameters are set forth in Table IV.

TABLE IV

| Condition B | Sheet temperature before the PU application PU(° F.) | Sheet temperature with the PU before entering the UV reactor (° F.) | Thickness of the PU (mils) | Gloss after the first UV reactor (60°) | Gloss after the second reactor (60°) |
|---|---|---|---|---|---|
| 1 | 74 | 74 | 1.89 | 38.8 | 37.5 |
| 2 | 74 | 92 | 1.3 | 41.3 | 40 |
| 3 | 74 | 100 | 2.23 | 41 | 46.3 |
| 4 | 74 | 111 | 1.89 | 72.7 | 71.3 |
| 5 | 74 | 124 | 2.1 | 73.5 | 74.6 |
| 6 | 74 | 125 | 1.6 | 73.4 | 74.5 |
| 7 | 74 | 130 | 1.39 | 70.1 | 67.8 |
| 8 | 74 | 142 | 1.18 | 60.6 | 54.3 |
| 9 | 96 | 93 | 1.57 | 41.5 | 25.9 |
| 10 | 100 | 114 | 1.4 | 41.9 | 30.6 |
| 11 | 101 | 137 | 0.85 | 67.9 | 57.9 |
| 12 | 103 | 116 | 1.57 | | 21.8 |
| 13 | 105 | 99 | 2.2 | 29 | 30 |
| 14 | 106 | 102 | 1.02 | 41 | 39.2 |
| 15 | 106 | 104 | 2.03 | 24.9 | 26 |
| 16 | 108 | 108 | 2.16 | 31.2 | 31.1 |
| 17 | 108 | 114 | 1.4 | 27.5 | 28.8 |
| 18 | 108 | 119 | 1.1 | 32.1 | 37.8 |
| 19 | 109 | 108 | 0.68 | 38.4 | 27 |
| 20 | 109 | 126 | 0.85 | 56.7 | 44.4 |
| 21 | 110 | 105 | 1.61 | 24.7 | 28.2 |
| 22 | 112 | 120 | 1.23 | 47.3 | 40.3 |
| 23 | 123 | 134 | 0.81 | 67.4 | 56.9 |
| 24 | 126 | 110 | 0.81 | 48.2 | 34 |
| 25 | 126 | 114 | 1.14 | 44 | 45.3 |

The data allows us to draw the same conclusions as in Example I except that specular gloss in this Example II was controlled in a range from about 26 to 75 when measured at a 60° angle.

Figure 5:
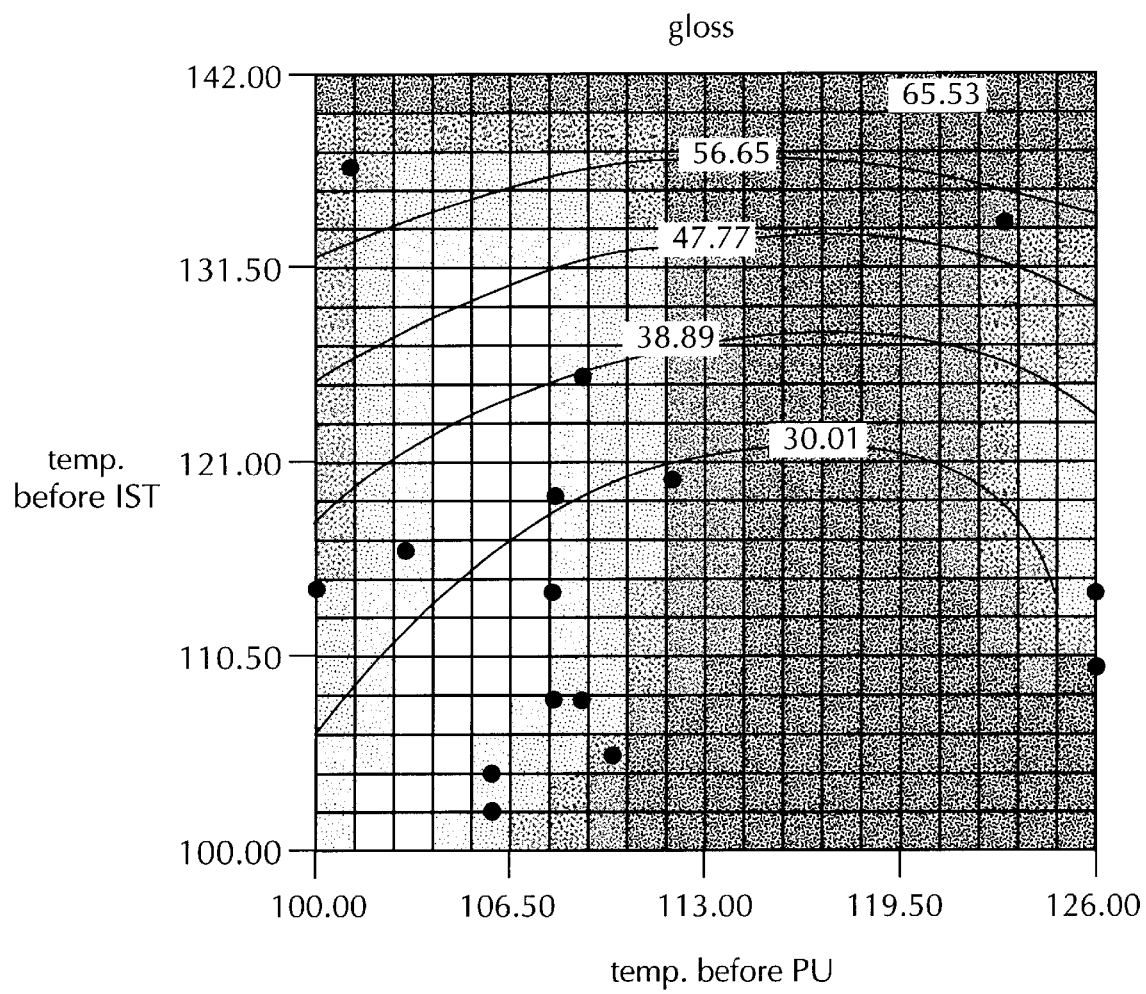
FIG. 5 is a two dimensional graph illustrating the substrate temperature conditions of FIG. 4.

The Design Expert software was used with the data from Table IV to plot the data illustrated in FIGS. 4 and 5 and to develop the following Equation (II) for predicting specular gloss at a polyurethane coating temperature of 130° F.

$$gloss = -1383.04 + (37.40 \times TBPU) +$$

$$(7.72 \times TBIST) - (0.30 \times TBPU^2) -$$

$$(0.010 \times TBIST^2) - (0.16 \times TBPU \times TBIST) +$$

$$(1.293E - 03 \times TBPU^3) -$$

$$(2.594E - 04 \times TBIST^3) -$$

$$(6.544E - 04 \times TBPU^2 \times TBIST) +$$

$$(1.225E - 03 \times TBPU \times TBIST^2) \quad \text{(II)}$$

Diagnostic case statistics were run to compare actual and predicted values of specular gloss with the following results:

Diagnostic Case Statistics

| Standard Order | Actual Value | Predicted Value |
|---|---|---|
| 1 | 56.90 | 58.42 |
| 2 | 34.00 | 39.47 |
| 3 | 45.30 | 39.14 |
| 4 | 67.80 | 67.41 |
| 5 | 47.60 | 65.44 |
| 6 | 37.50 | 36.46 |
| 7 | 46.30 | 49.47 |
| 8 | 71.30 | 57.69 |
| 9 | 74.50 | 65.86 |
| 10 | 40.00 | 43.80 |
| 11 | 57.90 | 56.56 |
| 12 | 21.80 | 26.49 |

The foregoing results were within acceptable ranges of experimental error.

Example III

Four samples were prepared under the conditions of temperature of the polyurethane, energy level and the temperature of the sheet before entering the air/UV cure unit (with or without Infra red heating) as set forth in Table V. The level of gloss that was recorded on the samples was measured in the grout (smooth depressed area). As can be readily seen, the gloss level increased as the temperature of the sheet was increased. The sheet temperature was measured immediately as it entered into the air/UV cure unit. The method of heating the sheet to reach a set surface temperature can be achieved with other types of equipment such as hot air blower, selective infra red heating, and others.

The equipment used to measure the temperature was a SPY GUN PM plus from Raytek. Santa Cruz, Calif., U.S.A.

The gloss measuring equipment was a micro gloss 60 degree gloss meter manufactured by BYK Gardner, Wallingford, Conn. USA.

The power of the lamps was measured using the LIGHT BUG IL390B maufactured by International Light Inc. of Newbury Port, Mass., U.S.A.

TABLE V

| SAMPLE | 1 | 2 | 3 | 4 |
|---|---|---|---|---|
| Air/UV Energy (mJ/cm²) | 143 | 126 | 166.0 | 166.0 |
| N2/UV Energy (mJ/cm²) | 1200 | 1200 | 1200 | 1200 |
| Urethane in the coater (° F.) | 150 | 150 | 150 | 150 |
| Infra red heaters | off | off | on | on |
| Actual sheet temperature off the field (° F.) | | | 140 | 170 |
| Actual sheet temperature entering Air/UV unit (° F.) | 135 | 122 | 139 | 158 |
| Finished product gloss (60°) | 22.4 | 20.9 | 28 | 35 |
| Thickness (mils) | .7 to 1.3 | .7 to 1.3 | .7 to 1.3 | .7 to #1.3 |

Example IV

Fifteen samples were prepared at a polyurethane temperature before coating of 145° F. and the conditions and gloss thereof are set forth below:

| Test Number | Factor a: sheet temperature before the PU application | Factor b: sheet temperature with the PU before the air UV reactor | gloss readings |
|---|---|---|---|
| 1 | 90 | 130 | 79.7 |
| 2 | 100 | 175 | 78.0 |
| 3 | 102 | 98 | 28.5 |
| 4 | 103 | 165 | 65.8 |
| 5 | 111 | 124 | 50.3 |
| 6 | 115 | 100 | 28.5 |
| 7 | 116 | 111 | 26.6 |
| 8 | 124 | 150 | 68.2 |
| 9 | 125 | 200 | 69.6 |
| 10 | 126 | 135 | 33.2 |
| 11 | 135 | 120 | 23.3 |
| 12 | 144 | 153 | 59.9 |
| 13 | 126 | 125 | 32.0 |
| 14 | 162 | 131 | 18.7 |
| 15 | 155 | 165 | 63.2 |

Figure 6:
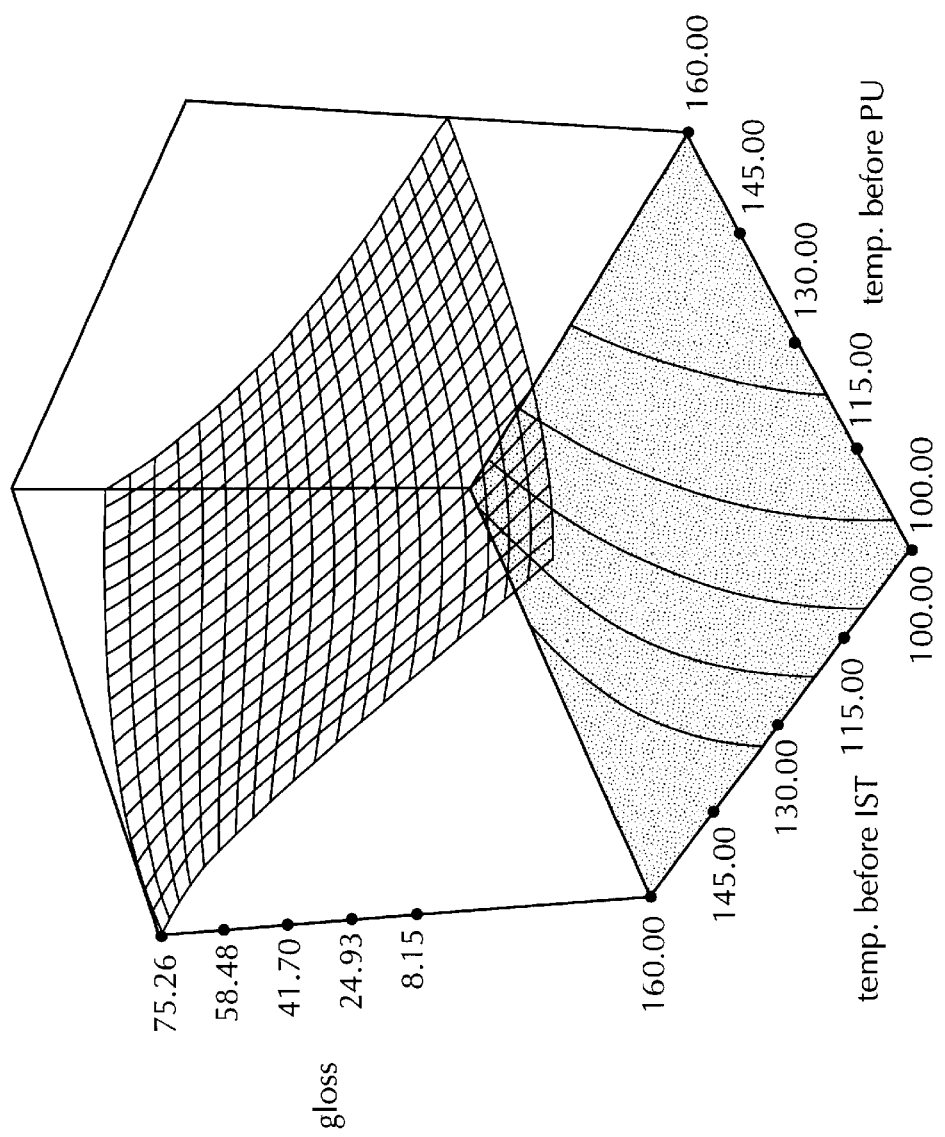
FIG. 6 is a three dimensional graph illustrating variations in specular gloss for another predetermined set of air cure energy and liquid polyurethane coating temperature with various substrate temperature conditions before and after the polyurethane is applied to the substrate.
Figure 7:
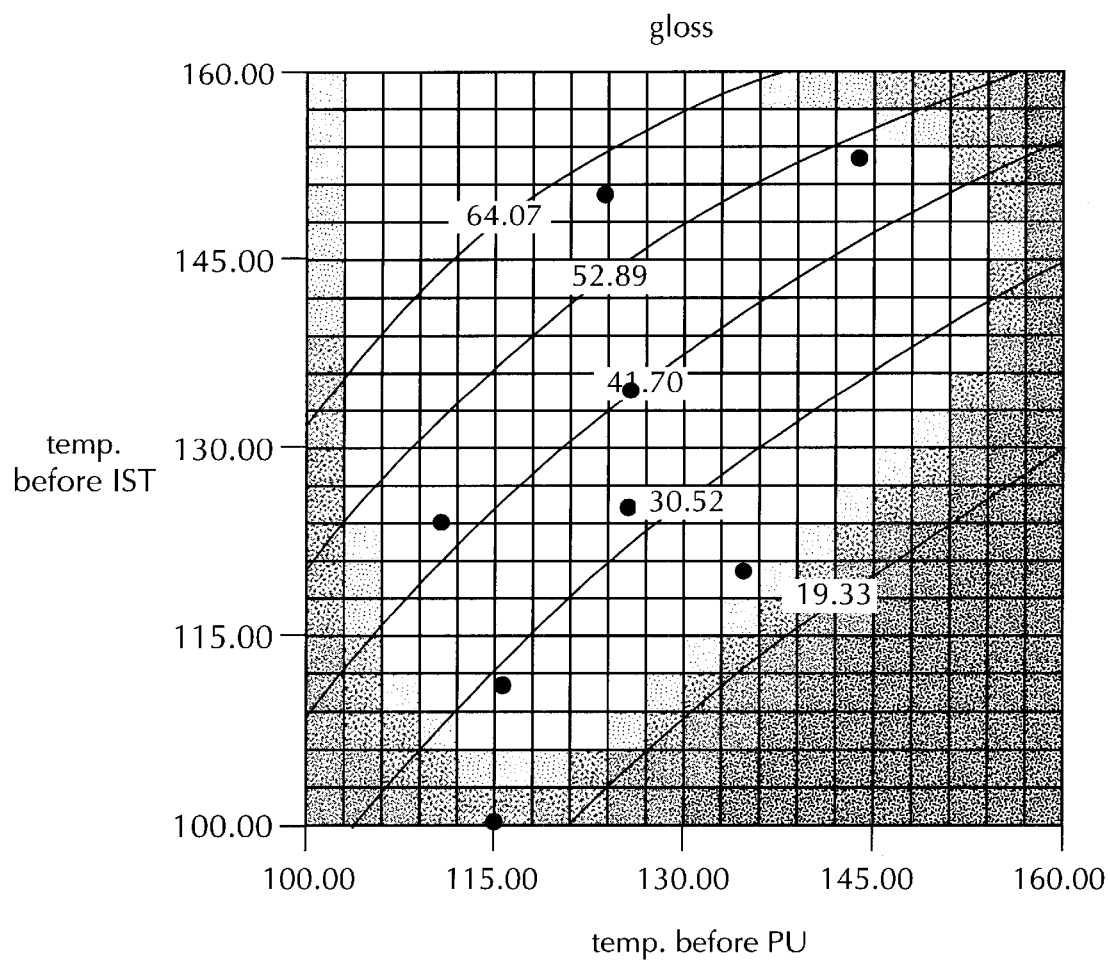
FIG. 7 is a two dimensional graph illustrating the substrate temperature conditions of FIG. 6.

As with the previous examples, the Design Expert software was used to plot the data illustrated in FIGS. 6 and 7 and to develop Equation (III).

$$1.0/\sqrt{gloss} = -0.033 + 5.081E{-}03 \times TBPU + 1.461E{-}03 \times TBIST + 8.486E{-}06 \times TBPU^2 + 1.862E{-}05 \times TBIST^2 + 4.292E{-}05 \times TBPU \times TBIST \quad (III)$$

The diagnostic case statistics for $1/\sqrt{gloss}$ were run to compare actual and predicted values of specular gloss. They were within acceptable experimental error and the data is summarized below.

| | Diagnostics Case Statistics | |
|---|---|---|
| Standard Order | Actual Value $1/\sqrt{gloss}$ | Predicted Value $1/\sqrt{gloss}$ |
| 1 | 0.19 | 0.18 |
| 2 | 0.14 | 0.15 |
| 3 | 0.11 | 0.11 |
| 4 | 0.19 | 0.18 |
| 5 | 0.12 | 0.11 |
| 6 | 0.19 | 0.21 |
| 7 | 0.11 | 0.12 |
| 8 | 0.21 | 0.21 |
| 9 | 0.13 | 0.14 |
| 10 | 0.12 | 0.12 |
| 11 | 0.12 | 0.13 |
| 12 | 0.17 | 0.16 |
| 13 | 0.18 | 0.17 |
| 14 | 0.13 | 0.12 |
| 15 | 0.23 | 0.23 |

Note: Predicted values include block corrections.

What is claimed is:

1. A method of making a surface covering and predetermining the specular gloss of a polyurethane wear layer thereon, comprising the sequential steps of:
   preselecting the temperature of a substrate;
   preselecting the temperature of a liquid polyurethane formulation having a matting agent incorporated therein;
   coating said liquid polyurethane on the substrate;
   adjusting the temperature of the substrate to a preselected temperature after the liquid polyurethane is coated thereon and before said liquid polyurethane is cured; and
   curing the polyurethane to form said wear layer having a predetermined specular gloss.

2. The method of claim 1 wherein the surface covering is floor covering or wall covering.

3. The method of claim 2 wherein the substrate comprises a wear layer and the liquid polyurethane is coated over the wear layer.

4. The method of claim 3 wherein the wear layer is flexible polyvinylchloride.

5. The method of claim 3 wherein the wear layer is laminated on an underlying surface covering intermediate.

6. The method of claim 1 wherein the liquid polyurethane is radiation-curable using ionizing radiation.

7. The method of claim 6 wherein the curing is comprised of radiation curing in a first stage in an air atmosphere and a second stage in a nitrogen atmosphere.

8. The method of claim 1 wherein the liquid polyurethane is photo-curable using ultraviolet light.

9. The method of claim 8 wherein the curing is comprised of photo-curing in a first stage in an air atmosphere and a second stage in a nitrogen atmosphere.

* * * * *